(12) United States Patent
Tang et al.

(10) Patent No.: US 6,597,577 B1
(45) Date of Patent: Jul. 22, 2003

(54) SYSTEMS WITH PEDESTAL STANDS FOR MOUNTING COMPONENTS

(75) Inventors: Kenneth K. Tang, Sacramento, CA (US); Darrel Wayne Poulter, Middleton, ID (US); Craig Arthur Sanford, Grass Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

(21) Appl. No.: 09/991,095

(22) Filed: Nov. 16, 2001

(51) Int. Cl.[7] ................................................. H05K 7/00
(52) U.S. Cl. ..................... 361/724; 248/917; 360/97; 439/620
(58) Field of Search ............................... 361/724–727, 361/681–687; 248/917–923; 16/340; 206/305, 320; 360/97–99; 439/620, 638; 455/89–90

(56) References Cited

U.S. PATENT DOCUMENTS

| | | | |
|---|---|---|---|
| 3,697,084 A | 10/1972 | Ban | 374/4 F |
| 3,959,823 A | 5/1976 | Royer | 360/99 |
| 3,964,098 A | 6/1976 | Kramer et al. | 360/93 |
| 4,062,049 A | 12/1977 | Dirks | 360/78 |
| 4,194,224 A | 3/1980 | Grapes et al. | 360/97 |
| 4,349,850 A | 9/1982 | Harvey | 360/74.2 |
| 4,359,762 A | 11/1982 | Stollorz | 360/98 |
| 4,413,328 A | 11/1983 | Videki, II | 364/900 |
| 4,633,350 A | 12/1986 | Hanson | 360/98 |
| 4,821,146 A | 4/1989 | Behrens et al. | |
| 4,912,580 A | 3/1990 | Hanson | 360/98.01 |
| 5,122,914 A | 6/1992 | Hanson | 360/98.01 |
| 5,162,980 A | 11/1992 | Morgan et al. | |
| 5,323,298 A | 6/1994 | Keane | |
| 5,327,308 A | 7/1994 | Hanson | 360/97.01 |
| D366,455 S * | 1/1996 | Cheng | D13/147 |
| 5,515,215 A | 5/1996 | Hanson | 360/98.01 |
| 5,517,373 A | 5/1996 | Hanson | 360/98.01 |

(List continued on next page.)

FOREIGN PATENT DOCUMENTS

| | | |
|---|---|---|
| GB | 808848 | 6/1992 |
| JP | 57-94687 | 2/1956 |
| JP | 50-97454 | 12/1980 |

OTHER PUBLICATIONS

Photographs (copies): 1) Compaq ProLiant; 2) Dell PowerEdge; 3) HP NetServer; 4) IBM Netfinity 1"; 5) IBM Netfinity 1.6" 6)Sun Ultra Enterprises; 7)HP Disk Array 1994; 8) Trimm Technology 1997; 9) Xyratex Salient Drive Carrier 1997; 10) Symbios 1998; 11) HP Disk Array 1995; 12) DEC Storage Works 1994; 13) HP NetServer LX Pro 1998; 9 pps.

Photograph (copy): Dataflux Rugged Winchester, 5800R"Tw inchesters", Signal, 10/82, p. 102.

"Hard Facts About The ROLM Military Hard Disk," Defense Electronics, 10/52, p. 32.

(List continued on next page.)

*Primary Examiner*—Darren Schuberg
*Assistant Examiner*—Hung Van Duong

(57) ABSTRACT

System for mounting components are provided. A representative system includes a pedestal stand with first and second pedestal base components. Each of the pedestal base components includes an upper mating member, a lower mating member and a support member. Each of the upper mating members are adapted to overlie and mate with a corresponding lower mating member of the other pedestal base component. So adapted, when the respective upper mating members are mated with corresponding lower mating members, the first support member is spaced from the second support member to form a channel therebetween. A chassis can be received within the channel.

20 Claims, 8 Drawing Sheets

U.S. PATENT DOCUMENTS

| | | | |
|---|---|---|---|
| 5,563,748 A | 10/1996 | Hanson | 360/97.01 |
| 5,602,696 A | 2/1997 | Hanson | 360/97.01 |
| 5,627,727 A * | 5/1997 | Aguilera et al. | 361/686 |
| 5,682,277 A | 10/1997 | Hanson | 360/97.01 |
| 5,764,434 A | 6/1998 | Hanson | 360/97.01 |
| 5,828,546 A | 10/1998 | Tirrell et al. | |
| 5,883,757 A | 3/1999 | Hanson | 360/97.01 |
| 6,091,571 A | 7/2000 | Hanson | 360/98.04 |
| 6,095,862 A | 8/2000 | Doye et al. | |
| 6,097,567 A | 8/2000 | Hanson | 360/97.01 |
| 6,101,087 A * | 8/2000 | Sutton et al. | 361/686 |
| 6,188,576 B1 | 2/2001 | Ali et al. | |
| 6,366,453 B1 * | 4/2002 | Wang et al. | 361/681 |

OTHER PUBLICATIONS

Dataflux disc drives make the grade. Again; Signal, Oct. 1982, p. 102.

Micro–Winchester subsystem is Multibus–combatible, Mini–MicroWorld; Mini–Micro Systems, Jun. 1981, p. 33.

Mil–Spec, From The Ground Up; Signal, Oct., 1982, 3 pps.

Only Miltope flexible disk drives meet the tough standards of the toughest business of them all; Defense Electronics, Mar. 1981, p. 41.

Calendar, Defense Electronics, Dec. 1962, pp. 51–52.

ASF Pluggable Design, F. Dibble, W. L. Jaskiewicz, W. C. Miller and R.E. Weber; IBM Technical Disclosure Bulletin, vol. 24, No. 1A, Jun. 1981, IBM Corp. 1981, p. 28.

Low–Cost, Rack–Mounted, Direct–Access Disk Storage Device, W. P. Bakkan, R.C. Lentz, F.C. Pexton and J.R. Reidenbach, IBM Technical Disclosure Bulletin, vol. 19, No. 10, Mar. 1977, IBM Corp. 1977.

U.S. patent application Ser. No. 09/809,409 (10012052–1, 50819–1490), entitled "Systems with Enhanced Electrostatic Discharge Protection," filed on Mar. 15, 2001.

* cited by examiner

SYSTEMS WITH PEDESTAL STANDS FOR MOUNTING COMPONENTS

FIELD OF THE INVENTION

The present invention generally relates to electronic components. More specifically, the invention relates to storing and/or mounting of electronic components, such as data storage devices, by using pedestal stands.

DESCRIPTION OF THE RELATED ART

Electronic components are formed in a wide range of shapes and sizes and are adapted to be stored in a variety of orientations. By way of example, data storage devices, e.g., disk drives, can be rack mounted and/or desk-top mounted. Regardless of the particular mounting orientation, such a data storage device typically is mounted to a chassis that is used to secure the data storage device. In order to enhance secure mounting, chassises can be mounted to other structures, e.g., walls. The use of a chassis also enables convenient interconnection of various components, e.g., transmission media, to a data storage device.

Much like the components that are mounted by chassises, chassises too are formed in a wide range of shapes and sizes and are adapted to be mounted in a variety of orientations. For instance, some chassises may only be adapted for desk-top use, which generally includes placing the chassis in a substantially horizontal orientation. In such a chassis, pads or feet may be provided on a side surface of the chassis upon which the chassis is to rest. As is known, however, a chassis arrange in a desk-top orientation tends to use a relatively large amount of space and, therefore, tends to be disfavored.

In order to alleviate some of the shortcomings associated with a desk-top orientation of a chassis, some users have attempted to place a chassis on its end. Although this produces the desired result of decreasing the foot print of the chassis and, thus, saves space, other problems can be created. For example, since chassises can be rather tall and narrow when placed on end, such a chassis may not provide a stable platform. In particular, the chassis may tend to tip over, potentially resulting in damage of components mounted to the chassis. For those chassises that incorporate rotating or, otherwise, moving components, e.g., disk drives, the chassises may tend to become unstable during component operation.

Based on the foregoing, it should be appreciated that there is a need for improved systems, methods and/or devices that address these and/or other shortcomings of the prior art.

SUMMARY OF THE INVENTION

The present invention relates to storing and/or mounting electronic components. In this regard, a representative embodiment of a system for mounting an electronic component includes a pedestal stand with two substantially wedge-shaped pedestal base components. The pedestal base components are securable to each other so as to define a chassis-receiving channel. Each of the pedestal base components also define an upper support surface for engaging an end of a chassis as well as an inner sidewall for engaging a side of the chassis. Preferably, each of the upper support surfaces is arranged substantially perpendicular to a corresponding one of the inner sidewalls.

The upper support surfaces and inner sidewalls also can be adapted to move relative to each other so that a chassis, which is inserted within the chassis-receiving channel and engages the upper support surfaces, causes the inner sidewalls to incline inwardly toward each other. In this manner, an inwardly-directed clamping force of the inner sidewalls upon the chassis can be provided and/or increased.

Another embodiment of a system for mounting an electronic component includes a pedestal stand that incorporates a first pedestal base component and a second pedestal base component. The first pedestal base component includes a first upper mating member, a first lower mating member and a first support member, and the second pedestal base component includes a second upper mating member, a second lower mating member and a second support member. The first upper mating member is adapted to overlie and mate with the second lower mating member, and the second upper mating member is adapted to overlie and mate with the first lower mating member. So adapted, when the respective upper mating members are mated with corresponding lower mating members, the first support member is spaced from the second support member to form a channel therebetween. Preferably, this channel is sized and shaped for receiving at least one chassis.

Another embodiment of a system for mounting an electronic component includes a pedestal stand and a chassis. The pedestal stand includes a first pedestal base component and a second pedestal base component, which together define a chassis-receiving channel. The chassis is sized and shaped for being received within the chassis-receiving channel and includes first and second sidewalls and an endwall. The first and second sidewalls are spaced from each other to define an interior for mounting an electronic component.

The first pedestal base component includes a first upper mating member, a first lower mating member and a first support member, and the second pedestal base component includes a second upper mating member, a second lower mating member and a second support member. The first upper mating member is adapted to overlie and mate with the second lower mating member, and the second upper mating member is adapted to overlie and mate with the first lower mating member. Once so mated, the first support member is spaced from the second support member to form the chassis-receiving channel therebetween.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

FIG. 7 is a partially-exploded, perspective view of an embodiment of the component system of the present invention showing assembly detail of the panel and chassis.

DETAILED DESCRIPTION

As will be described in greater detail herein, systems, devices and/or methods of the present invention can facilitate mounting of computer and/or other electronic components. This is accomplished by using pedestal stands that are adapted to receive and retain a component(s) in position. For instance, such a pedestal stand can be configured to mount a chassis, which typically is adapted to be mounted in a rack and/or on a desk-top, in a desk-side orientation. As used herein, the term "desk-side" refers to an orientation of a chassis that results in the smallest footprint of the chassis, eg., the chassis is placed on its end.

Figure 1:
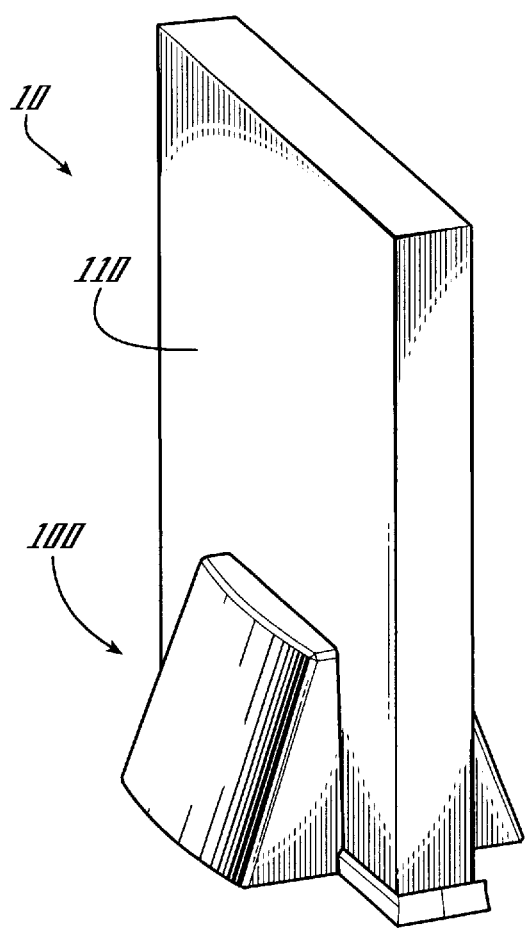
FIG. 1 is a schematic diagram depicting an embodiment of the component system of the present invention.

Referring now to the drawings wherein like reference numerals indicate corresponding components throughout the several views, FIG. 1 is a schematic diagram depicting a representative embodiment of a component system 10 of the present invention. As shown in FIG. 1, component system 10 includes a pedestal stand 100 and a chassis 110. Chassis 110 can be provided in various configurations and can be adapted to store and/or mount one or more computer related and/or electronic components. By way of example, chassis 110 can be adapted to mount one or more storage medium modules (a representative example of which will be described in detail later) and network interface cards, among others. Pedestal stand 100 is adapted to support chassis 110, such as in the desk-side orientation depicted in FIG. 1.

Figure 2:
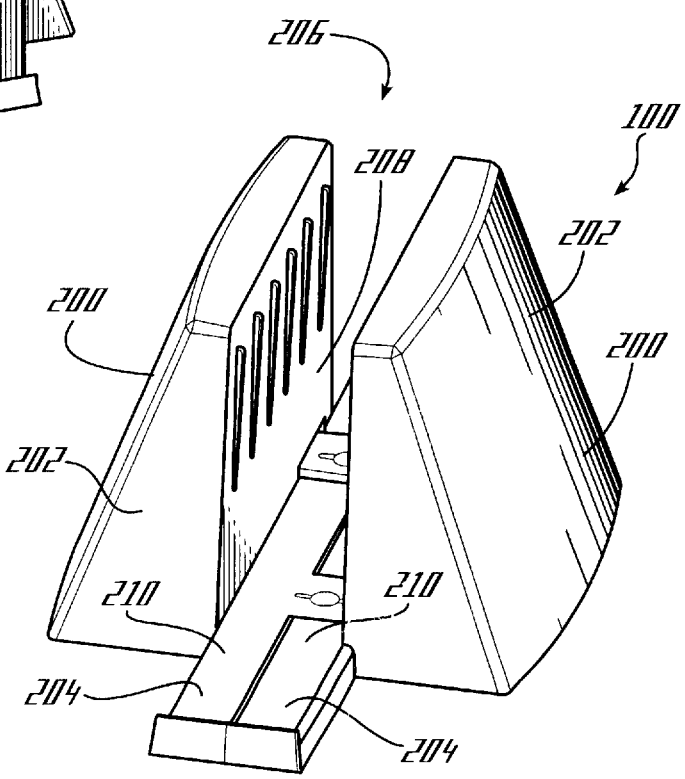
FIG. 2 is a perspective view of the embodiment of the pedestal stand of FIG. 1.

As shown in FIG. 2, pedestal stand 100 includes two pedestal base components 200. Each pedestal base component 200 includes a support member 202 and a support rail 204. When assembled as a pedestal stand, the support members 202 are spaced from each other to form a chassis-receiving channel 206 that is sized for receiving at least a portion of a chassis. Such a chassis, e.g., chassis 110 of FIG. 1, can be inserted between inner sidewalls 208 of the respective support members so that the chassis engages support surfaces 210 of the support rails.

Figure 3:
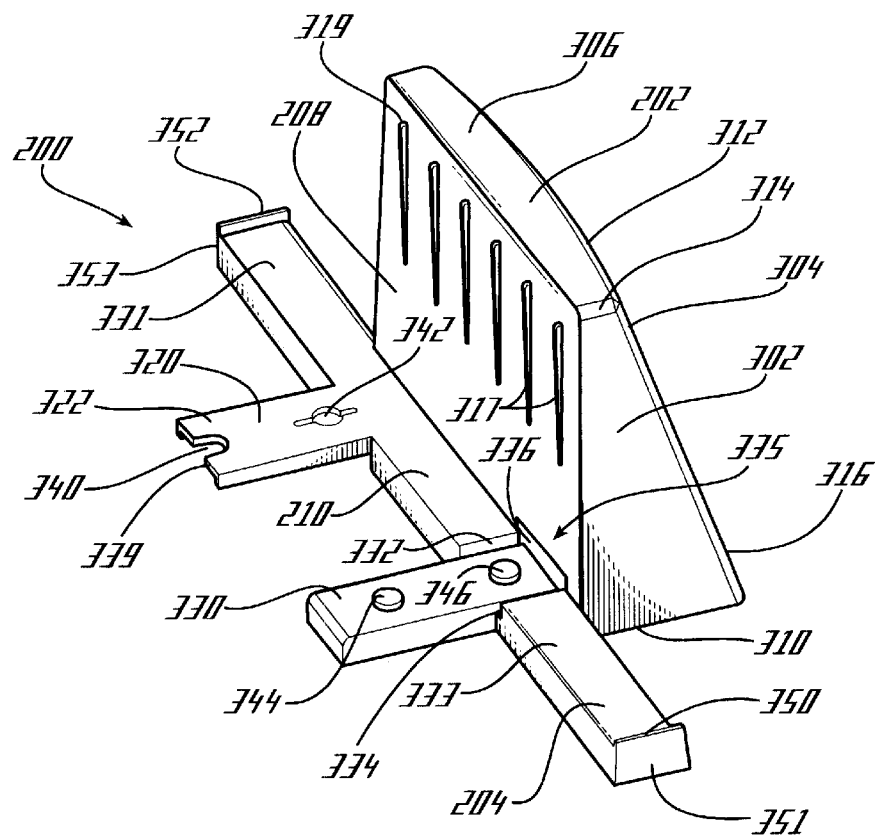
FIG. 3 is a perspective view showing detail of one of the pedestal base components of the pedestal stand of FIGS. 1 and 2.

Features of a pedestal base component will now be described in greater detail with reference to FIG. 3. In FIG. 3, pedestal base component 200 is depicted with a support member 202 and support rail 204. Support member 202 includes an inner sidewall 208 that extends outwardly from the support rail as well as opposing endwalls 302 (one of which is depicted in FIG. 3). An outer sidewall 304 extends between the endwalls and a topwall 306.

The inner sidewall, outer sidewall, topwall, and endwalls form a wedge-like structure that preferably is larger at its base 310 than at the topwall 306. More specifically, outer wall 304 inclines inwardly from base 310 to topwall 306. This particular configuration provides a broadened base for providing lateral support to a chassis. Note, various other shapes of the walls that form support member 202 can be used. Additionally, at least some of the edges formed at the intersections of the various walls of the support member can be eased. By way of example, edges 312, 314 and 316 are generally rounded when viewed in cross-section.

In the embodiment of FIG. 3, inner sidewall 208 includes at least one protrusion or clamping rib 317. Each of the clamping ribs preferably is tapered from top to bottom and includes a generally rounded top portion 319, which is adapted to guide a chassis during insertion into the chassis-receiving channel. The clamping rib(s) is adapted to apply a clamping force to a chassis. More specifically, when a chassis is placed between the inner sidewalls of mated pedestal base components (see FIG. 1), the weight of the chassis against the respective support rails of the mated pedestal base components 204 can cause the inner sidewalls to incline or clamp inwardly toward each other. In this manner, a gripping or clamping force can be applied to opposing sides of the chassis. The clamping of the inner sidewalls and/or the clamping rib(s) also potentially enables the pedestal base components to compensate for dimensional variation of components, e.g., various widths of chassises.

Support rail 204 engages support member 202 and, much like inner sidewall 208, is configured to engage a chassis. In particular, such a chassis can engage support surface 210 of the support rail as well as support surface 320 of an upper mating member 322. Upper mating member 322 extends outwardly from support rail 204 and, as will be described in greater detail herein, is used to mate a pedestal base component 200 with another pedestal base component.

A lower mating member 330 also extends outwardly from support rail 204. More specifically, when the support rail includes first and second segments (331 and 333), which are spaced from each other to form a gap 335 (such as depicted in the embodiment of FIG. 3), lower mating member 330 preferably is arranged within the gap. In such an arrangement, mating member-receiving channels 332 and 334 can be defined between the lower mating member and support rail 204. An opening 336 also can be formed at a proximal end 337 of lower mating member 330. As will be described in detail later, channels 332 and 334 as well as opening 336 are adapted to receive the distal end 339 of an upper mating member 322, i.e., the distal end of an upper mating member of another pedestal base component.

The upper and lower mating members incorporate complimentary mating features for promoting secure engagement of two pedestal base components. In FIG. 3, for instance, upper mating member 322 defines a recess 340 and an opening 342, each of which can be received about a protrusion 344, 346 of the lower mating member of another pedestal base component. Clearly, various types and arrangements of mating features can be used. For example, by using multiple mating features, various widths of channel-receiving channels can be provided. Engagement of pedestal base components will be described in greater detail later.

Support rail 204 also includes a fence 350 arranged at a first of its ends 351 and a second fence 352 arranged at a second of its ends 353. Each fence extends beyond support surface 210 and, as such, provides a lip for retaining a chassis between the fences. This configuration tends to prevent a chassis from sliding longitudinally beyond the fences of the support rail. This function can be useful, such as during a hot-swapping operation, when a data storage module of the chassis is removed and/or replaced by a user.

Figure 4:
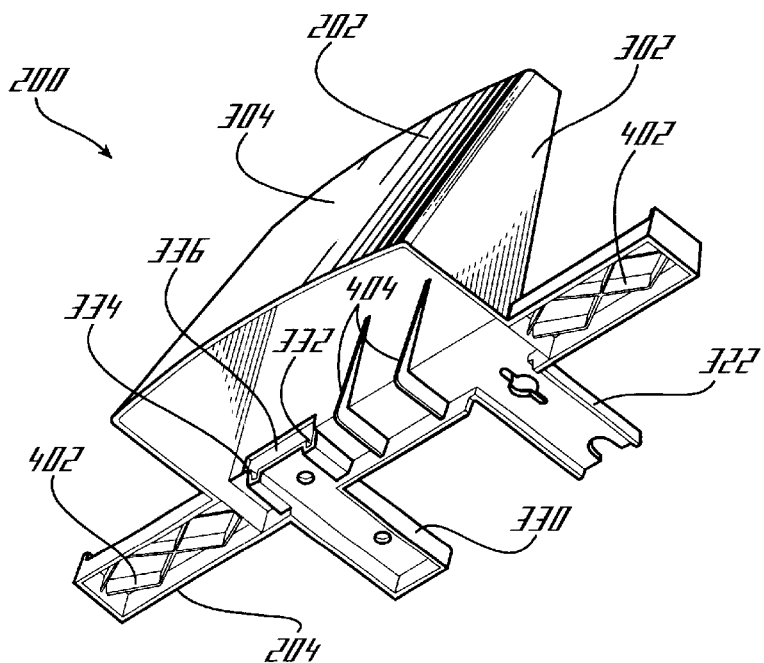
FIG. 4 is a perspective view of the pedestal base component of FIG. 3 showing detail of the underside of the pedestal base component.

The underside of the embodiment of the pedestal base component 200 of FIG. 3 is depicted in FIG. 4. As shown in FIG. 4, support rail 204 can include stiffening ribs 402 for providing structural reinforcement to the support rail. In particular, the stiffening ribs can increase the bending and/or torsional rigidity as well as the stiffness of the support rail. By increasing the rigidity and/or stiffness of the support rails, a chassis can be appropriately supported when the pedestal base is positioned or moved across an uneven surface. Ribs 404 also can be provided to rigidify engagement between the inner sidewall 208 and the support rail 204. Note, the relationship between the channels 332 and 334 and opening 336 can be seen in FIG. 4.

The ability of a pedestal base to provide a stable support platform can become important, particularly when a chassis (es) mounted by such a pedestal base includes components that rotate at high rates of speed. For instance, recently produced 3.5 inch form factor disk drives can rotate at 15K rpm. Thus, a pedestal base mounting a chassis that includes such a disk drive should be stable enough so that rotational performance of the disk drive is not degraded.

The underside view of FIG. 4 also reveals that some embodiments of the pedestal base components 200 include support members that are substantially hollow. This can reduce the cost associated with manufacturing materials and enables manufacture by techniques such as injection molding. By way of example, the various features of a pedestal base component can be formed of low-cost plastic resin that can be formed with a pre-selected color blend. In this manner, a desired appearance can be provided without a post-molding color application.

The pedestal base component of FIGS. 3 and 4 also can be formed by offset injection molding, i.e., a part offset from true perpendicular can be used. By way of example, an offset of 5 degrees from true perpendicular can enable a pedestal base component to release from its mold without using draft walls of the vertical adjoining surfaces. Preferably, the base datum surface is formed at a 90 degree angle relative to the sidewalls.

Figure 5:
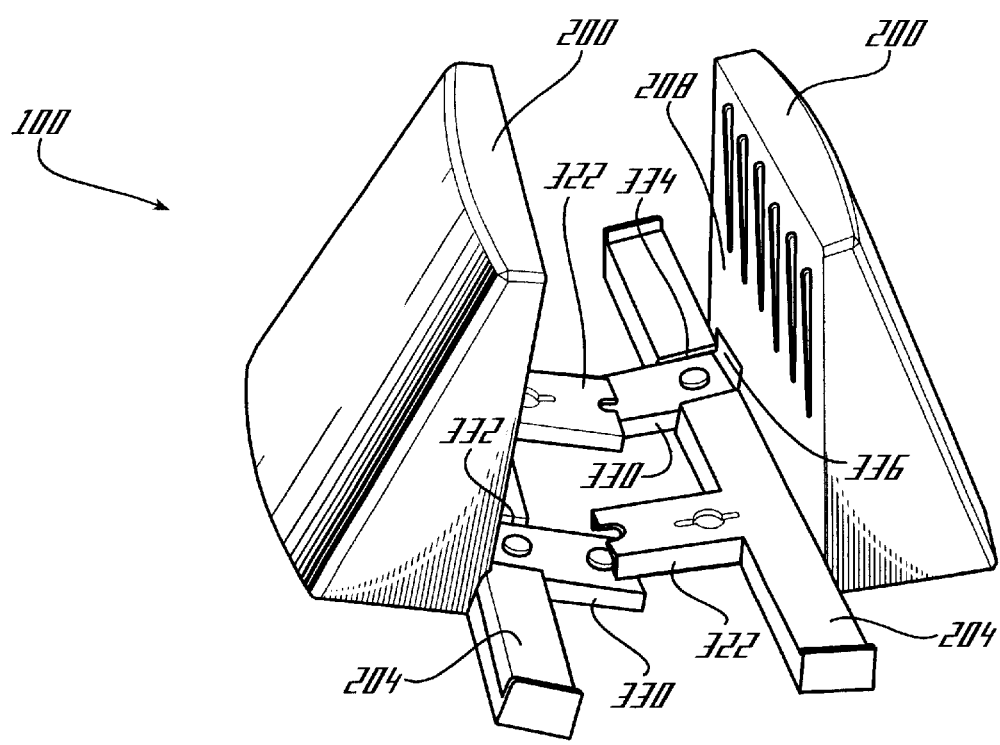
FIG. 5 is a perspective view of the pedestal stand of FIGS. 1 and 2 showing assembly detail of the pedestal base components.

Assembly of a pedestal stand 100 will now be described with reference to FIG. 5. As shown in FIG. 5, pedestal base components 200 can be arranged so that their inner sidewalls 208 generally face each other. The respective support rails 204 then can be oriented so that the upper mating member 322 of each component overlies a corresponding lower mating member 330 of the other component. The pedestal base components 200 then can be moved closer together so that the distal ends of each of the mating members 322 is received by corresponding channels 332 and 334. Continued movement of the components then enables the distal end of each of the upper mating members to enter the opening 336 of the other component. The protrusions and corresponding openings/recesses of the mating members then are aligned and the protrusions are seated within the desired openings/recesses. Thus, an orientation such as that depicted in FIG. 2 can be achieved.

Figure 6:
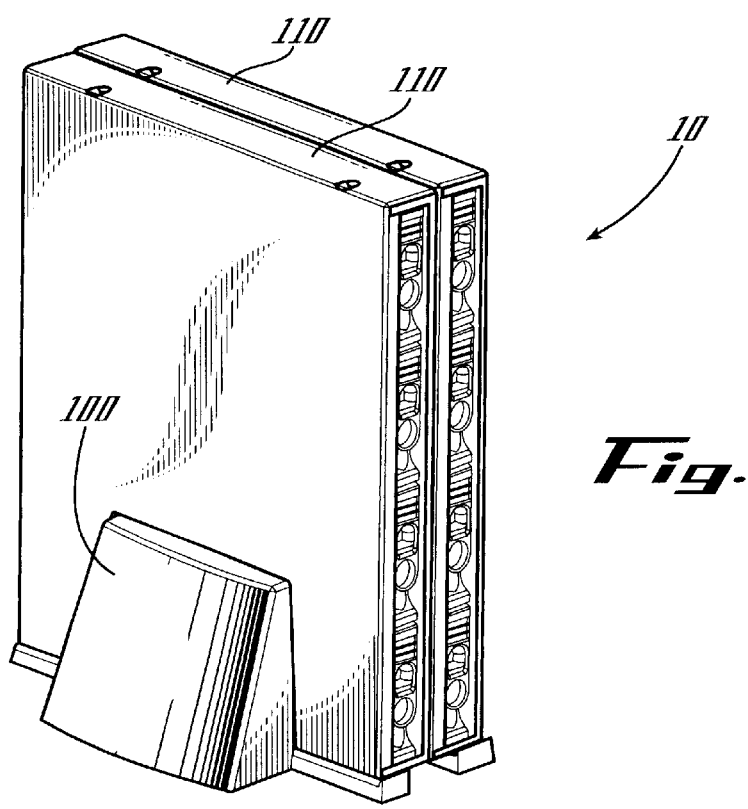
FIG. 6 is a perspective view of another embodiment of the component system of the present invention that includes a pedestal stand mounting multiple chassises.
Figure 1:
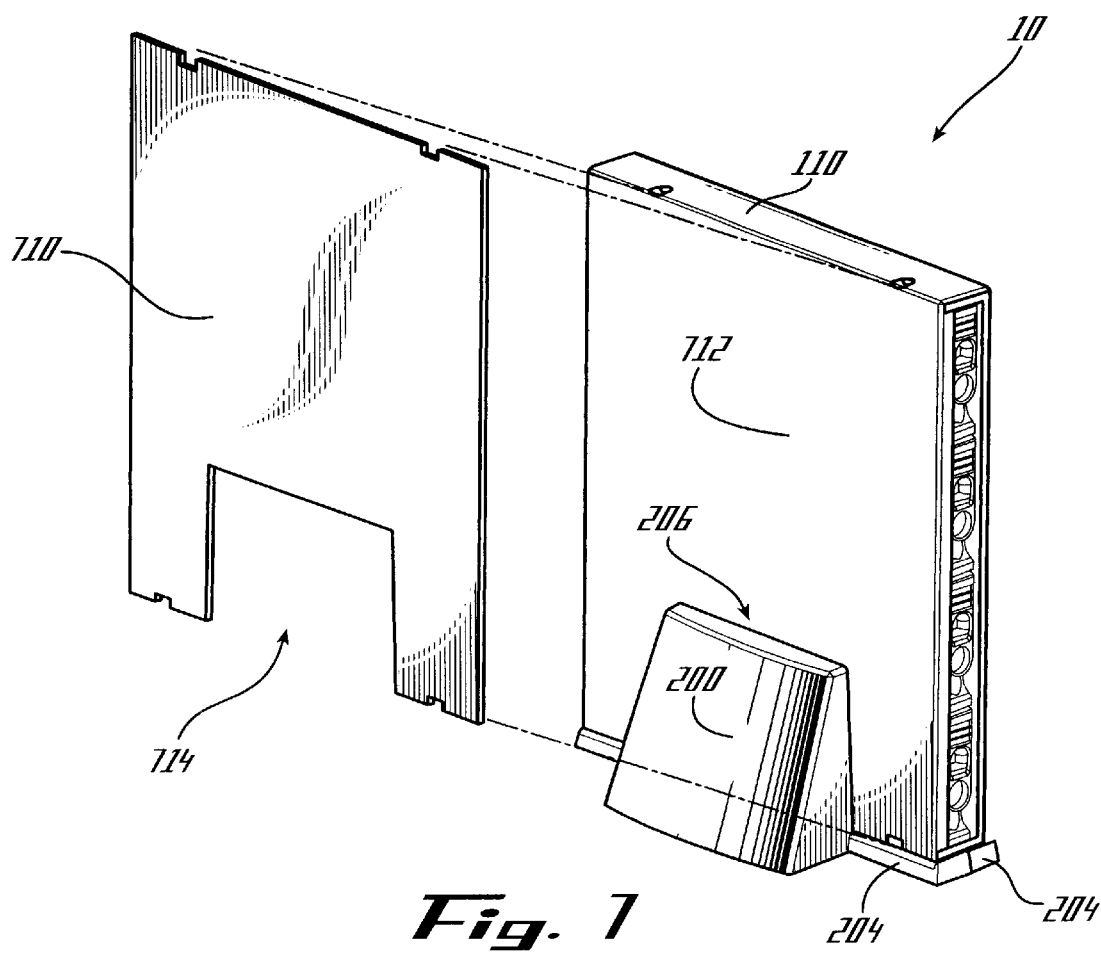

As shown in FIG. 6, various numbers and, thus, sizes of chassises 110 can be accommodated by the pedestal stand. More specifically, in FIG. 6, the support members of the pedestal stand are separated from each other greater than the distance of separation depicted in FIG. 2. This can be accomplished by disengaging the pedestal base components and aligning the protrusions with another set of openings. The protrusions then can be seated within these openings/recesses to secure the positions of the pedestal base components relative to each other.

In FIG. 7, a chassis 110 is inserted within the chassis-receiving channel 206 of a pedestal stand and is supported by support rails 204. A panel 710 also is depicted in FIG. 7. Panel 710 can be installed to cover a side 712, e.g., an unfinished underside, of the chassis. In the embodiment depicted in FIG. 7, panel 710 includes a recessed or cut-out portion 714 that is shaped to be received about a pedestal base component 200. More specifically, the support member of the pedestal base component can be received by the cut-out portion. Note, installation of a panel 710 does not adversely affect the operability of the component system 10 and typically is used for aesthetic purposes. However, the panel can provide a support surface upon which the chassis may rest, such as may occur during maintenance.

Figure 8:
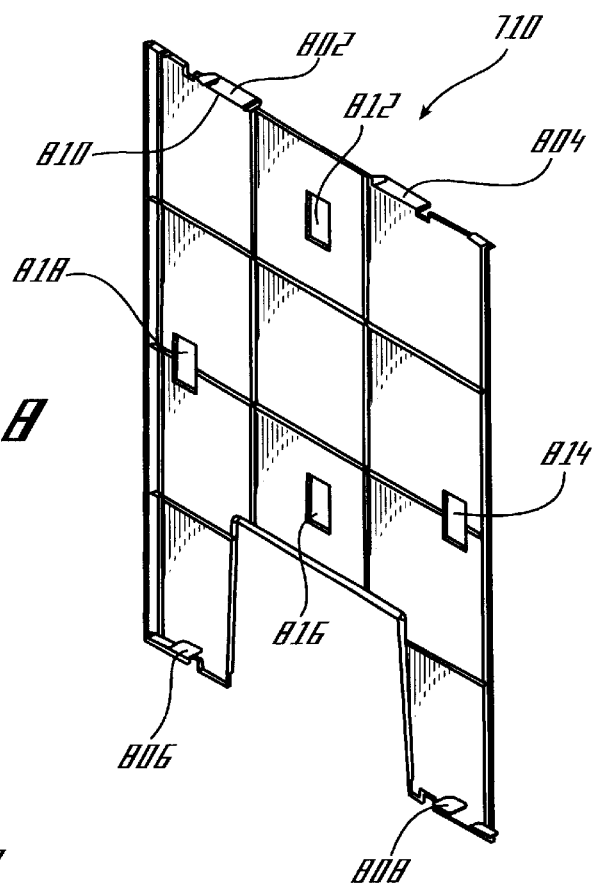
FIG. 8 is a perspective view of the embodiment of the panel of FIG. 6 showing detail of the panel surface that is adapted to engage a chassis.

As shown in greater detail in FIG. 8, which depicts the opposite side of the panel shown in FIG. 6, the panel 710 includes multiple tabs, e.g., tabs 802 through 808. Each of these tabs is adapted to be received within a corresponding opening of the chassis. Preferably, each tab includes a tapered tip, e.g., tip 810 of tab 802, 810 that facilitates convenient insertion of the tab within its corresponding opening. The tabs also serve as keying features for the panel so that, if the panel is not correctly oriented relative to the chassis, a user would receive a visual and tactile feedback indicating that the tabs are blocked from mating with the chassis. This is particularly useful when PSA pads are used to attach the panel to the chassis. More specifically, the use of tabs and corresponding openings can prevent the panel from being mis-aligned with the chassis prior to pad engagement with the chassis. Note, in FIG. 8, the PSA pads can be arranged at positions 812 through 818.

Figure 9:
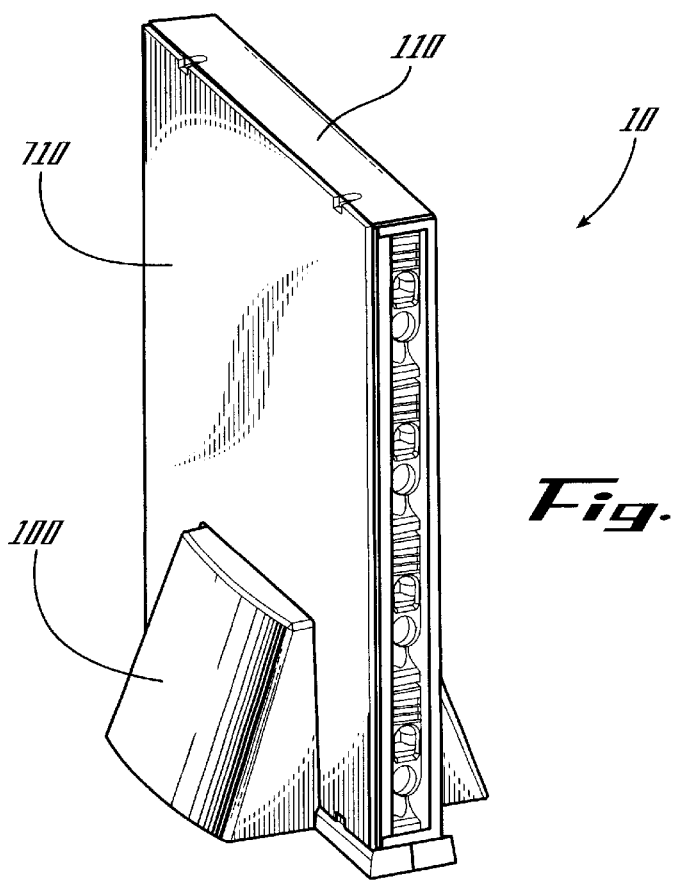
FIG. 9 is a perspective view of the embodiment of the component system of FIG. 6 shown with the panel installed onto the chassis.

The tabs also can act as spring tabs that can potentially enable the panel to fit a range of enclosure or chassis products. This is accommodated by elastic bending and/or torsional deflection of the tabs that occurs when the tabs flex to fit a chassis. Upon seating within a corresponding opening and latching, strain on a tab can be relaxed as an interference fit of the tab is achieved relative to the chassis. The panel is shown in an installed position in FIG. 9.

Figure 10:
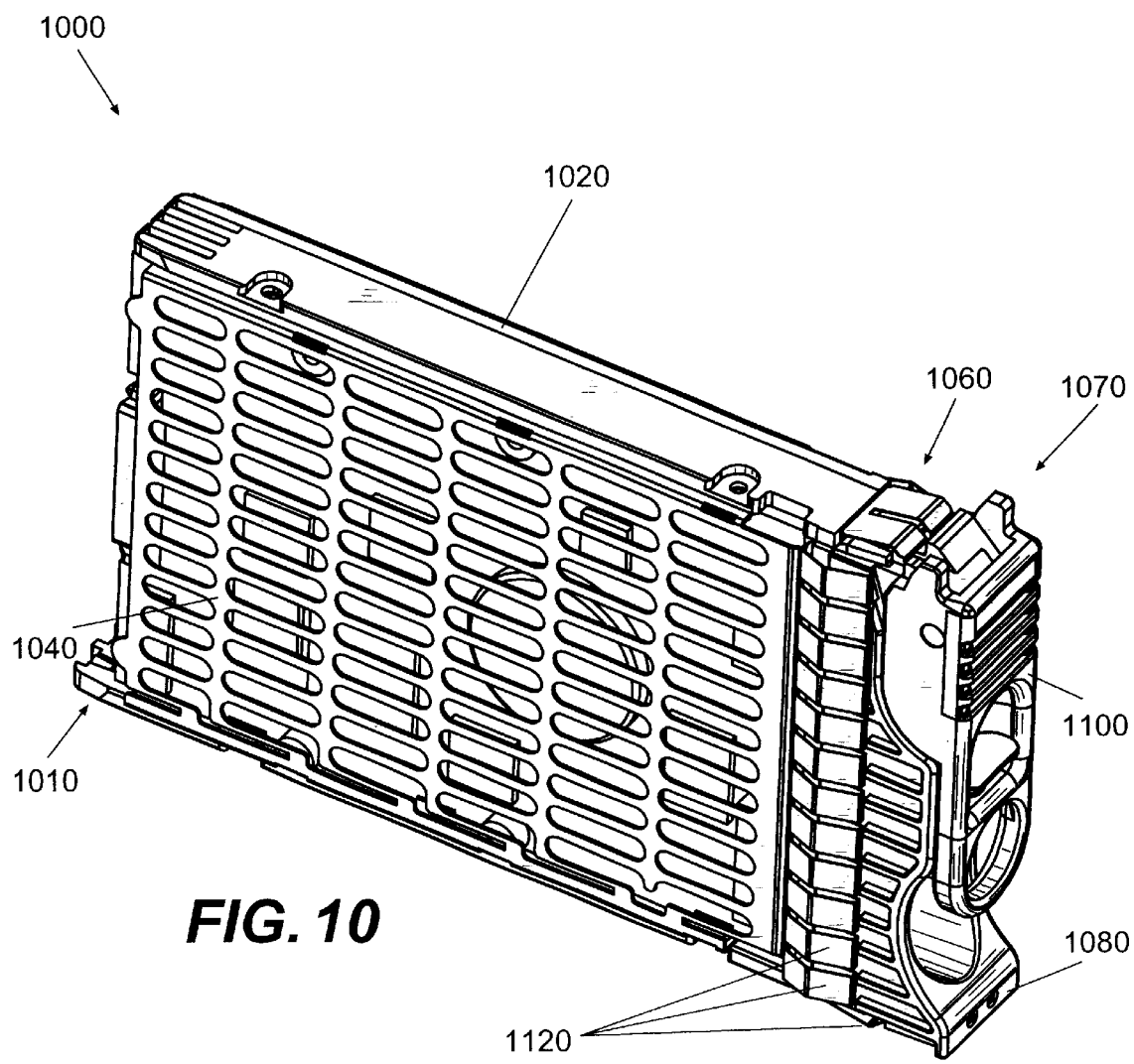
FIG. 10 is a perspective view of an embodiment of a storage medium module that can be mounted to the chassis of FIG. 9.

A representative embodiment of the storage medium module or carrier 1000 that can be mounted within a chassis of a component system of the invention is depicted in FIG. 10. As shown in FIG. 10, carrier 1000 includes a housing 1010, which incorporates a carrier frame 1020 and a protective circuit assembly (PCA) cover 1040. Frame 1020 is sized and shaped for receiving and mounting a data storage device. As used herein, the term "data storage device" refers to any device that is capable of storing data, such as a disk drive, CD ROM, or an atomic resolution storage device, among others. At least partial encasement of such a data storage device within carrier 1000 is facilitated ed by PCA cover 1040. PCA cover 1040 is adapted to mate with the carrier frame 1020. Once so mated, carrier frame 1020, PCA cover 1040, and a corresponding data storage device cooperate so as to provide a protective enclosure for more sensitive components of the data storage device, such as storage device circuit assembly (not shown). For example, and not for the purpose of limitation, the storage device circuit assembly may be positioned between the PCA cover 1040 and an opposing exterior surface of the data storage device.

In addition to providing a protective enclosure for at least a portion of an associated data storage device, in some embodiments, PCA cover 1040 can function as a heat sink for the d at a storage device. In these embodiments, the PCA cover can be formed of a material such as aluminum, for example.

As shown in the embodiment of FIG. 10, carrier 1000 includes an EMI shield 1060, and a handle assembly 1070, which incorporates a carrier bezel 1080 and a handle 1100. In some embodiments, handle 1100 provides the dual functionality of serving as a carrying handle, which may be utilized for repositioning the carrier, and a locking mechanism for facilitating secure mounting of the carrier to an appropriate chassis or other mounting device. Preferably, the EMI shield incorporates spring fingers 1120, described in detail herein after.

Figure 11:
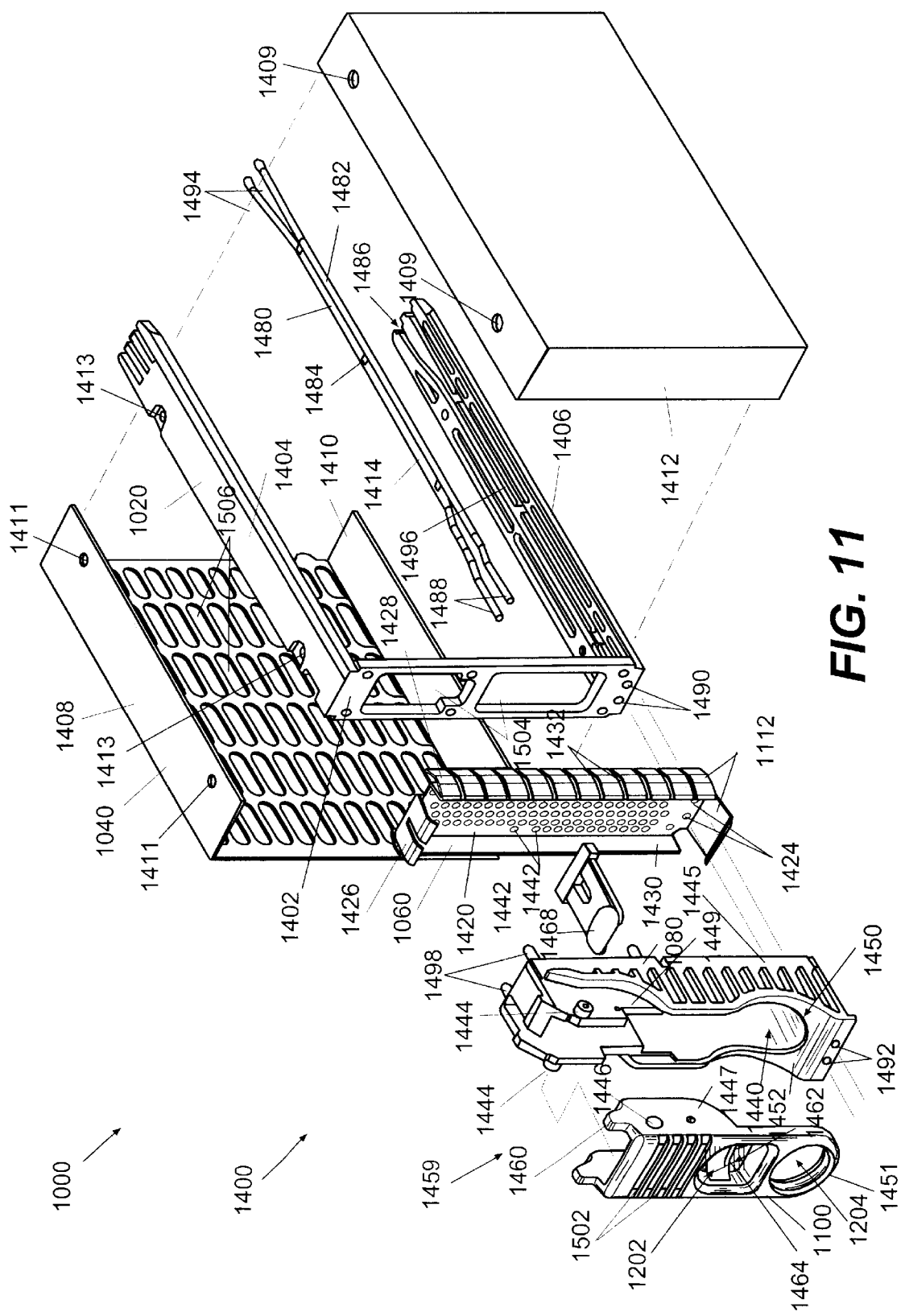
FIG. 11 is an exploded, perspective view of the storage medium module of FIG. 10.

Reference will now be made to FIG. 11, which depicts preferred assembly detail of the embodiment of the carrier 1000 depicted in FIG. 10. As shown in FIG. 11, carrier 1000 includes frame 1020, PCA cover 1040, EMI shield 1060, bezel 1080, and cam handle 1100. Frame 1020 incorporates a face plate 1402 and rails 1404 and 1406, which extend outwardly from face plate 1402. Frame 1020 is configured to receive PCA cover 1040. By way of example, in the embodiment depicted in FIG. 11, sidewalls 1408 and 1410 of PCA cover 1040 engage between rails 1404 and 1406, respectively, of frame 1020. Sidewalls 1408 and 1410 are appropriately spaced to receive a data storage device, e.g., a disk drive 1412. Thus, the data storage device is received at least partially between sidewalls 1408 and 1410.

Data storage device 1412 and PCA cover 1040 preferably are mounted to frame 1020 by aligning mounting holes 1409 of the data storage device, mounting holes 1411 of PCA cover 1040, and mounting holes 1413 of frame 1020. Mechanical fasteners (not shown) then are inserted through the aligned holes. In some embodiments, structural stability of the mounted data storage device 1412 is enhanced by a snug fit of device 1412 between the sidewalls of the PCA cover. Similarly, a snug fit of the sidewalls of the PCA cover between the rails of frame 1020 also may enhance the structural stability of the module. The snug fit of the sidewalls of the PCA cover between the rails of the frame 1020 also tends to be promoted by the mechanical fasteners, which draw the rails against the PCA cover as the fasteners are tightened.

Frame 1020 is adapted to engage a lightpipe assembly 1414, which will be described in detail hereinafter. Additionally, frame 1020 and, more specifically, face plate 1402, is adapted to engage EMI shield 1060. EMI shield 1060 includes a body portion 1420 that defines various apertures. In particular, an array of apertures 1422 is provided, with the apertures 1422 being sized and shaped to impede and/or prevent the propagation of electromagnetic energy from components arranged behind shield 1060, e.g., data storage device 1412. In some embodiments, apertures 1422 each are configured with a hexagonal shape and also provide the function of enabling air to flow through the shield. This configuration tends to promote cooling of the data storage device 1412. Body portion 1420 also includes apertures 1424 that are adapted to facilitate placement and/or viewing of lightpipe assembly 1414.

Preferably, spring fingers 1120 depend from body portion 1420, such as along an outer periphery of the body portion. Various numbers and configurations of spring fingers 1120 may be provided. All such numbers and configurations are considered well within the scope of the invention. The spring fingers preferably provide one or more of the following functions: (1) promoting structural stability to reduce externally and/or internally generated shock and/or vibration; (2) promoting electrical grounding continuity between carrier 1000 and a component(s) to which it is mounted, and/or other carriers of such a component(s); and (3) enhancing EMI and/or ESD control of the carrier.

Various aspects of enhancing EMI and/or ESD control of a carrier/chassis system are described in detail in co-pending U.S. patent application Ser. No. 09/809,409 (10012052-1, 50819-1490), entitled "Systems with Enhanced Electrostatic Discharge Protection," filed on Mar. 15, 2001. That application is commonly assigned to the Hewlett-Packard Company and is incorporated herein by reference in its entirety.

In FIG. 11, EMI shield 1060 includes both forward-facing spring fingers 1426 and rearward-facing spring fingers 1428 (forward-facing generally referring to a direction away from data storage device 1412, and rearward-facing generally referring to a direction toward device 1412). Spring fingers 1428 preferably extend from flanges 1430, which, in combination with the forward-facing spring fingers 1426, are adapted to extend about at least a portion of bezel 1080.

EMI shield 1060 is formed, at least partially, of an appropriate shielding material, such as stainless steel, among others. EMI shield 1060 is formed of an appropriate thickness of material or otherwise is configured so as to provide suitable flexibility to one or more of the various spring fingers 1120. So formed, the spring fingers preferably deflect in response to a displacement force, such as when engaging a corresponding portion of a chassis cage slot, for example. As the spring fingers tend to be biased to their non-displaced positions (shown in FIG. 11), this configuration enables the flexible spring fingers to serve as dampers for damping encountered shock and/or vibration of the carrier. The flexible configuration of the spring fingers also accommodates variable pitch arrangements of multiple carriers. Additionally, slots 1432 formed between adjacent ones of the spring fingers may be appropriately sized and shaped for inhibiting propagation of electromagnetic energy beyond the material of the spring fingers.

The structure and accompanying functionality of bezel 1080 and cam handle 1100 will now be described. As shown in FIG. 11, bezel 1080 defines an interior cavity 1440 that is adapted to receive a thumb latch 1442 (described hereinafter). Pivot bosses 1444 are adapted to be received within corresponding pivot holes 1446 of cam handle 1100. Pivot bosses 1444 preferably are provided on sidewalls 1445 of the bezel, with pivot holes 1446 preferably being formed through sidewalls 1447 of the cam handle. Engagement of the bosses 1444 within the holes 1446 permits pivoting of cam handle 1100 about the bosses 1444 between an open or unlatched position (not shown) and a closed or latched position (not shown).

Each of bezel sidewalls 1445 preferably incorporates a recessed portion 1449 that is adapted to facilitate seating of the cam handle sidewalls 1447 when the cam handle is in the latched position. In the embodiment depicted in FIG. 11, the surface defining each bezel sidewall recessed portion 1449 extends to form a contoured profile of the bezel that provides appropriate clearance between the bezel and portions of the cam handle during pivoting of the cam handle.

Bezel 1080 preferably includes a recessed portion 1450 that is adapted to provide clearance between the distal end 1451 of the cam handle and the face 1452 of the bezel. This recessed portion enables a finger of a user to be inserted between the distal end of the cam handle and the bezel so as to facilitate grasping and pivoting of the cam handle.

In order to facilitate mounting of carrier 1000 into a corresponding chassis cage slot, for example, cam handle 1100 incorporates a latching mechanism 1459, which can be configured as one or more cam latches 1460. In a preferred embodiment, dual cam latches 1460 are provided, with each of the latches extending generally upwardly from a sidewall 1447 of the cam handle. Cam latches 1460 facilitate mounting of the carrier 1000 by engaging a corresponding latching surface. Preferably, spacing of the cam latches from each other is sufficient to enable nesting of the cam latches about a rail of an adjacently disposed carrier. Thus, line-to-line stacking of carriers can be accommodated in some embodiments.

Various openings are provided within and through the carrier to promote cooling of a data storage device. For instance, cam handle 1100 includes one or more louvers 1502 that, in addition to the thumb opening 1202 and finger opening 1204, are adapted to permit air to flow through the handle. Once passing through the handle, air can flow through cavity 1440 of the bezel, and then through the various apertures 1422 of the EMI shield 1060. After passing through the EMI shield, air can reach data storage device 1412 by passing through one or more frame openings 1504. Airflow toward and away from the data storage device also is provided by apertures 1506 formed through the PCA cover 1040. Various materials for promoting cooling of heat-producing components and/or protecting a user from such components may be utilized.

Lightpipe assembly 1414 will now be described in greater detail. Lightpipe assembly 1414 preferably includes two lightpipes, lightpipes 1480 and 1482, respectively, that are interconnected by one or more cross ties 1484. It should be noted that various other numbers of lightpipes may be utilized in other embodiments, with all such numbers being considered well within the scope of the present invention.

The configuration depicted in FIG. 11 enables lightpipe assembly 1414 to be assembled during a single molding operation. In particular, lightpipe assembly 1414 can be formed by pouring material into a suitable mold to form both lightpipes and their accompanying cross ties as a unitary structure.

Lightpipe assembly 1414 is received within a channel arrangement (pocket) 1486 that is formed within a rail of frame 1020. Once received within pocket 1486, viewing ends 1488 of the lightpipes may be viewable and/or extend at least partially through holes 1490 of frame 1020, holes 1424 of EMI shield 1060, and holes 1492 of bezel 1080. So provided, status light information typically provided by one or more light emitting diodes (LEDs) associated with the cage slot of a chassis may be propagated to the user for viewing.

In order to increase the chance for light emitted from the aforementioned LEDs (not shown) to enter the lightpipes, light acceptance cones 1494 may be provided at the LED ends of the lightpipes. As the cones have an increased cross-sectional surface area at their distal ends, as compared to the cross-sectional surface area of the cylindrical-shaped portions of the lightpipes, minor misalignment of the lightpipes with the LEDs of the cage slot may be accommodated. Thus, this configuration preferably enables a sufficient amount of light from the LEDs to be propagated through the lightpipes for viewing.

In order to keep lightpipe-to-lightpipe crosstalk to negligible visibility levels, an incident light separator 1496 preferably is disposed within the pocket 1486. Separator 1496 forms a physical partition between the lightpipes that is able to reduce the tendency of and/or prevent incident light from propagating between the lightpipes. At locations where the separator is not present, such as at occurrences of cross ties 1484, for example, crosstalk between the lightpipes can be reduced by providing the cross ties with a surface texture that promotes scattering of light. For instance, if the cross ties are configured with a non-smooth surface texture, light provided to the cross ties can tend to scatter and not propagate at full intensity from one lightpipe to the other via the cross ties.

Figure 12:
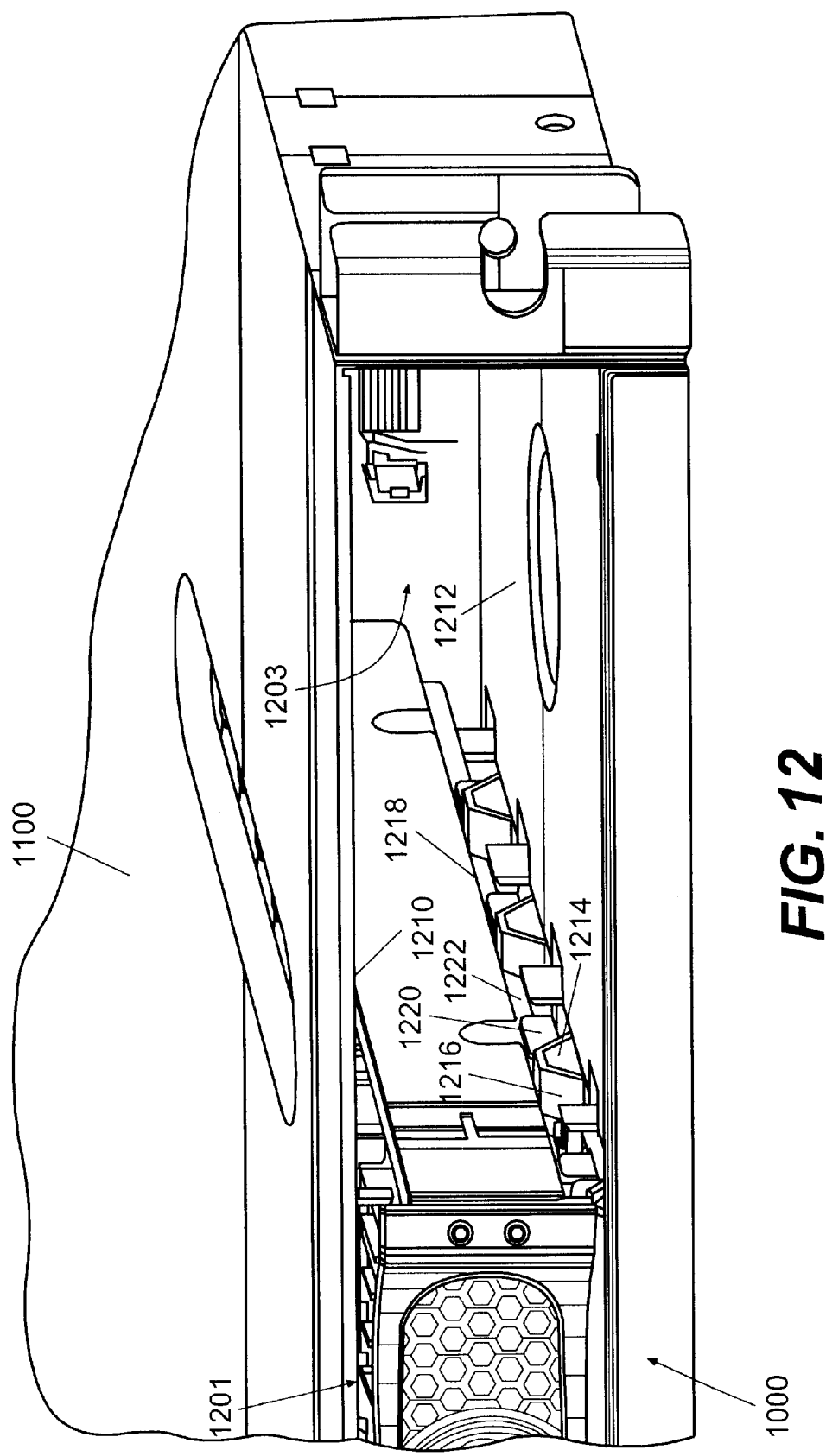
FIG. 12 is a partially cut-away, perspective view of the chassis of FIGS. 8 and 9 showing mounting detail of a representative storage medium module.

In FIG. 12, a carrier 1000 is shown mounted to a representative chassis 1100. Chassis 1200 of FIG. 12 defines multiple slots, e.g., slots 1201 and 1203, each of which can accommodate a carrier 1000. A carrier 1000 is depicted mounted within slot 1201 in a horizontal mounting position. Slot 1201 is defined, at least in part, by an upper wall 1210 and a lower wall 1212. The walls are spaced from each other at a distance that is sufficient to receive carrier 1000. Protrusions 1214, some of which can extend downwardly from upper wall 1210 while others extend upwardly from lower wall 1212, are configured to function as alignment guides for the carrier. More specifically, protrusions 1214 are configured to engage one or more surfaces of the carrier and tend to align the carrier with its slot as the carrier is slid into the slot. Protrusions 1214 can include generally rounded, or otherwise angled, front surfaces 1216 that tend to deflect a mis-aligned carrier toward a proper mounting position. The protrusions, which may be configured to engage various surface of a carrier, preferably engage side edges of the rails, such as edge 1218 of rail 1404.

Also provided are protrusions 1220, some of which can extend downwardly from upper wall 1210 while others extend upwardly from lower wall 1212. Protrusions 1220 are configured to function as supports for the carrier. These protrusions, which also may be configured to engage various surface of a carrier, preferably engage sides of the PCA cover, such as side 1222.

In order to mount the carrier within slot 1201, the handle preferably is pivoted to its unlatched position. The carrier is aligned with the slot and inserted rearwardly into the slot. The protrusions 1214 and 1220 preferably align and support the carrier and permit the carrier to be slid into the chassis to a sufficient depth to enable the cam latches of the handle to pass beyond a latching surface provided by the chassis. In some embodiments, such a latching surface can be formed by a protrusion 1214 and/or a protrusion 1220. Once inserted to an appropriate depth, the handle can be pivoted to its latched position so that the cam latches engage the latching surface(s). This secures the carrier within its slot.

While a carrier 1000 is being installed within and/or removed from a chassis, the pedestal base to which the chassis is mounted should be able to provide a stable platform. In particular, the component system should resist tipping over. As should be apparent from the foregoing description, providing a stable platform for one or more chassises can be accomplished by assembling a pedestal base without the use of tools. Such tools also are not needed during adjustment of the pedestal base. More specifically, tools are not required when changing the width of the chassis-receiving channel.

The foregoing description has been presented for purposes of illustration and description. It is not intended to be exhaustive or to limit the invention to the precise formns disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated.

For example, pedestal base components shown and described herein are identical to each other. By using identical pedestal base components, manufacturing costs associated with tooling as well as inventory control can be reduced. In other embodiments, however, it may be considered advantageous to form pairs of pedestal base components, with each of the components possessing features different than the other. All such modifications and variations, are within the scope of the invention as determined by the appended claims.

What is claimed is:

1. A system for mounting an electronic component comprising:
   a pedestal stand having a first pedestal base component and a second pedestal base component,
   said first pedestal base component having a first upper mating member, a first lower mating member and a first support member,
   said second pedestal base component having a second upper mating member, a second lower mating member and a second support member,
   said first upper mating member being adapted to overlie and mate with said second lower mating member, said second upper mating member being adapted to overlie and mate with said first lower mating member such that, when said upper mating members are mated with said lower mating members, said first support member is spaced from said second support member to form a channel therebetween.

2. The system of claim 1, wherein said first pedestal base component is identical to said second pedestal base component.

3. The system of claim 1, wherein said first support member has a first inner sidewall and said second support member has a second inner sidewall, said first inner sidewall and said second inner sidewall facing each other when said upper mating members are mated with said lower mating members.

4. The system of claim 1, wherein said first pedestal base component includes a first support rail, said first support rail engaging along a width of said first inner sidewall, said first support rail, said first upper mating member and said first lower mating member defining a first support surface for engaging a chassis; and
   wherein said second pedestal base component includes a second support rail, said second support rail engaging along a width of said second inner sidewall, said second support rail, said second upper mating member and said second lower mating member defining a second support surface for engaging a chassis.

5. The system of claim 1, further comprising:
   a panel having opposing side edges and a bottom edge, said bottom edge defining a cut-out portion, said cutout portion being sized and shaped to be received about a portion of said first pedestal base component.

6. The system of claim 3, wherein said first upper mating member and said first lower mating member extend outwardly from said first inner sidewall, and said second upper mating member and said second lower mating member extend outwardly from said second inner sidewall.

7. The system of claim 3, wherein said first inner sidewall defines a first upper member-receiving opening, said first upper member-receiving opening being sized and shaped to receive a distal end of said first upper mating member; and
   wherein said second inner sidewall defines a second upper member-receiving opening, said second upper member-receiving opening being sized and shaped to receive a distal end of said second upper mating member.

8. The system of claim 4, wherein said first support surface and said second support surface substantially reside in plane.

9. The system of claim 4, wherein said first support rail includes a first segment and a second segment, said first and second segments being spaced from each other to form a first gap, said first lower mating member extending outwardly from said first inner sidewall through said first gap; and
   wherein said second support rail includes a first segment and a second segment, said first and second segments of said second support rail being spaced from each other to form a second gap, said second lower mating member extending outwardly from said second inner sidewall through said second gap.

10. The system of claim 4, wherein said first support rail has opposing ends and is substantially elongated between said ends, each of said ends extending beyond the width of said first support member; and
    wherein said second support rail has opposing ends and is substantially elongated between said ends, each of said ends extending beyond the width of said second support member.

11. The system of claim 6, wherein each of said upper mating members includes at least one mating feature, and each of said lower mating members includes at least one complimentary mating feature, said at least one mating feature of each of said upper mating members being adapted to mate with said at least one complimentary mating feature of each of said lower mating members.

12. The system of claim 9, wherein said first support rail and said first lower mating member define first and second channels.

13. The system of claim 10, wherein said first support rail has a fence at each of said ends, each said fence extending outwardly from the plane of said first support surface.

14. The system of claim 11, wherein one of said at least one mating feature and said at least one complimentary mating feature is selected from a protrusion and an opening; and
    wherein the other of said at least one mating feature and said at least one complimentary mating feature is the other of a protrusion and an opening.

15. A system for mounting an electronic component comprising:
    a pedestal stand having a first pedestal base component and a second pedestal base component, said first pedestal base component and said second pedestal base component defining a chassis-receiving channel; and
    a chassis sized and shaped for being received within said chassis-receiving channel, said chassis having first and second sidewalls and an endwall, said first and second sidewalls being spaced from each other to define an interior for mounting an electronic component, said endwall engaging said first and second sidewalls,
    said first pedestal base component having a first upper mating member, a first lower mating member and a first support member,
    said second pedestal base component having a second upper mating member, a second lower mating member and a second support member,
    said first upper mating member being adapted to overlie and mate with said second lower mating member, said second upper mating member being adapted to overlie and mate with said first lower mating member such that, when said upper mating members are mated with said lower mating members, said first support member is spaced from said second support member to form said chassis-receiving channel therebetween.

16. The system of claim 15, further comprising:

a storage medium module mounted to said chassis.

17. The system of claim 15, further comprising:

a panel having opposing side edges and a bottom edge, said bottom edge defining a cut-out portion, said cutout portion being sized and shaped to be received about a portion of said first pedestal base component.

18. The system of claim 15, further comprising:

means for securing said first upper mating member to said second lower mating member; and means for securing said second upper mating member to said first lower mating member.

19. A system for mounting an electronic component comprising:

a pedestal stand having a two substantially wedge-shaped pedestal base components, said pedestal base components being securable to each other to define a chassis-receiving channel, each of said pedestal base components defining an upper support surface for engaging an end of a chassis and an inner sidewall for engaging a side of the chassis, each of said upper support surfaces being arranged substantially perpendicular to a corresponding one of said inner sidewalls, said upper support surface and said inner sidewalls being adapted to move relative to each other such that a chassis inserted within said chassis-receiving channel and engaging said upper support surface causes said inner sidewalls to incline inwardly toward each other thereby increasing an inwardly-directed clamping force of said inner sidewalls upon the chassis.

20. The system of claim 19, wherein said pedestal base components are adjustably securable to each other such that a width of said chassis-receiving channel can be selectively adjusted to accommodate various widths of chassises.

* * * * *